Feb. 14, 1956 L. A. SAFFORD 2,734,783
AIR BRAKE
Filed July 15, 1954
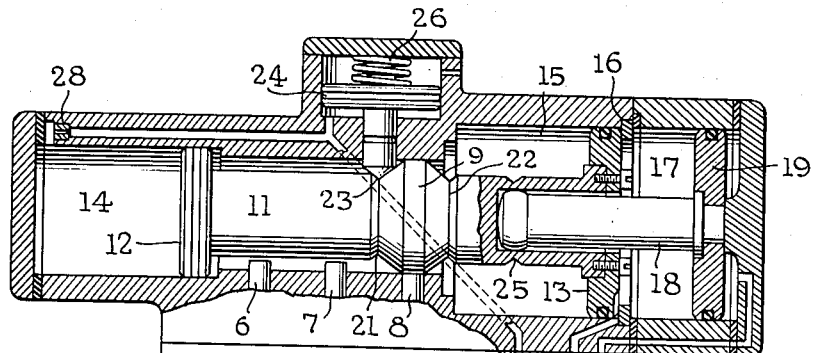
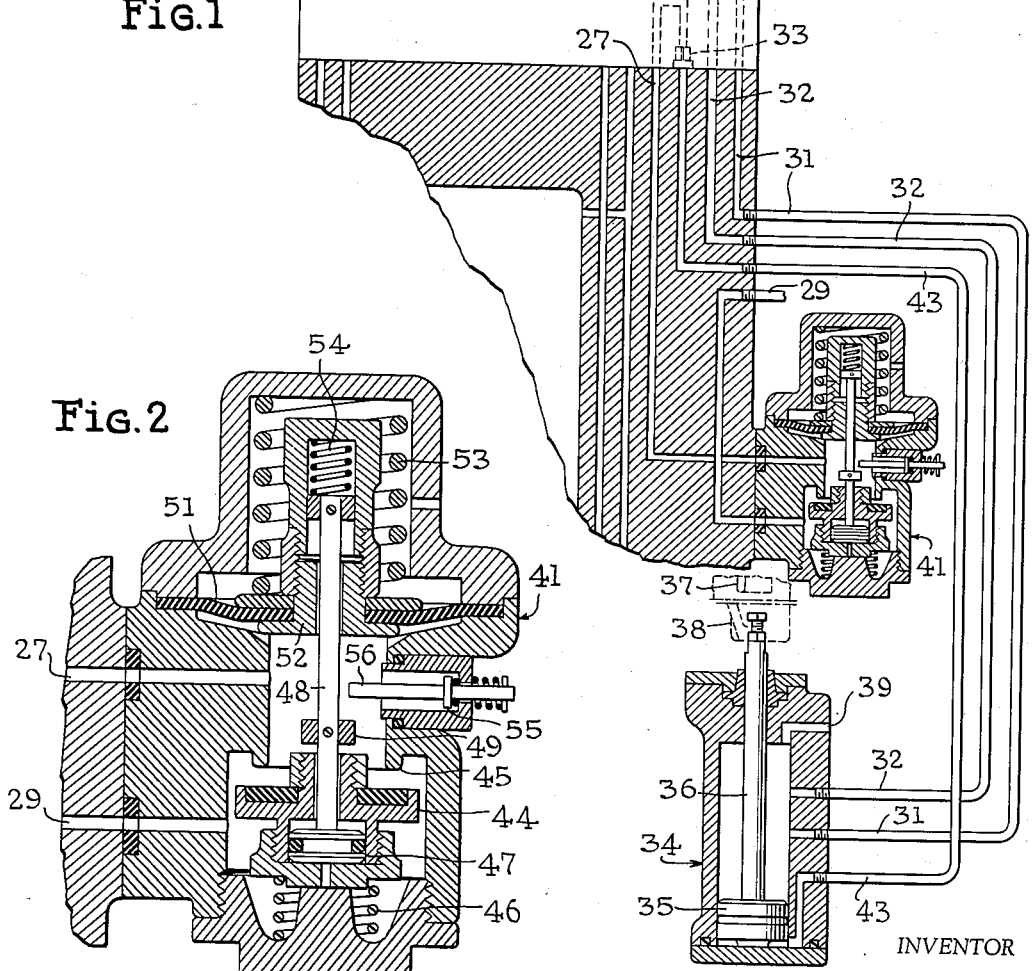
INVENTOR
Lewis A. Safford
BY
Dodge (signature)
ATTORNEYS

United States Patent Office 2,734,783
Patented Feb. 14, 1956

2,734,783
AIR BRAKE

Lewis A. Safford, Watertown, N. Y., assignor to The New York Air Brake Company, a corporation of New Jersey Application July 15, 1954, Serial No. 443,501

4 Claims. (Cl. 303—22)

This invention relates to air brakes of the load-compensating and empty and load types and particularly to the load-weighing portion of such a brake.

Load-weighing mechanisms are customarily so contrived that they function during the first portion of any brake pipe charge which starts with a vented brake pipe, and continues through only part of the charging cycle, say up to 50 or 60 p. s. i. At this stage weighing has been completed, the controlling adjustments (whatever they may be) have been completed, and the weighing mechanism retreats to a position in which it is not subject to wear because it is wholly disconnected from the spring-borne load.

The cycle just described is controlled by what the art calls a "cut-off valve." This controls the weighing device in response to the rise of brake-pipe pressure from atmospheric pressure. The present invention offers important improvements in the cut-off valve, a highly specialized mechanism which first charges the weighing mechanism, then vents it and finally establishes a condition which precludes recharge of the weighing mechanism until the brake pipe is again substantially completely vented.

The cut-off valve must operate with certainty and accuracy under a wide range of conditions, as to temperature, position of the car in the train, the extent of brake-pipe leakage, the rate of charge effected by the engineer's valve, etc. The one now about to be described has demonstrated in careful tests that it offers very superior operating characteristics. Attempts to flood it have uniformly failed. The cut-off valve and the related selector valve perform the weighing cycle with certainty and with a low consumption of brake pipe air, a point of great importance as expediting the charging of long trains.

The invention will now be described by reference to the accompanying drawing showing a typical embodiment.

In the drawing:

Figure 1 is a fragmentary diagrammatic assembly of a car unit comprising the selector valve, the weighing valve, and the cut-off valve, shown chiefly in axial section. The passages are all drawn as if they lay on the plane of section, so that all appear in a single view. More compact commercial arrangements are possible, but not essential.

Figure 2 is an axial section of the cut-off valve drawn on a larger scale.

To avoid multiplying reference numerals a single reference numeral will be applied to any passage and any branch thereof so far as free communication exists. Also where a pipe and a passage are in free communication a single reference numeral will be used, there being no functional distinction between a pipe and a continuing passage.

The selector valve and weighing valve are shown in greater detail in the application of Safford and Ross, Serial No. 444,896 filed July 21, 1954, and the present description will be limited to mechanisms claimable as the sole invention of Safford.

The mechanism of the joint application above identified is a three-position empty and load brake. It affords three braking ratios by the selective depression of three tappets, a "Load" tappet 6, an "Empty" tappet 8 and an "Intermediate" tappet 7.

These are depressed selectively by a lobe 9 which is carried by rod 11 connecting reset piston 12 and a larger load setting piston 13. Piston 12 is called the reset piston because in the first phase of every load-weighing operation piston 12 is forced all the way to the right until "Empty" position (shown in Fig. 1) is reached. After this the weighing operation proceeds, as will later be described.

Reset piston 12 works in a cylinder 14 closed at its left hand end and load setting piston 13 works in a cylinder 15 of larger diameter than cylinder 14. A stop ring 16 is clamped between the main housing and an extension thereof which houses a co-axial cylinder 17. This is closed at its right hand end and conveniently is of the same diameter as cylinder 15. The space between pistons 12 and 13 is vented to atmosphere.

The right hand end of rod 11 has a counterbore to receive the end of rod 18 attached to the intermediate setting piston 19 which works in cylinder 17. Rod 18 alines piston 19 and limits its approach to piston 13. On opposite sides of lobe 9 are annular grooves 21, 22 which are engaged by the nose 23 on the stem of latch-piston 24. A third groove 25 is located on stem 11, further to the right. Piston 24 is biased downward to latch-engaging position by spring 26.

Piston 24 works in a cylinder as shown. The space above the piston is vented to atmosphere, and the space below the piston is in free communication with passage 27. The cylinder space 14 to the left of reset piston 12 communicates with passage 27 through a choke 28.

The parts are proportioned as will now be described.

In "Empty" position (shown in Fig. 1) pistons 12 and 13 are to the right as far as they go, and nose 23 engages in groove 21. This position is reached by admitting pressure fluid to cylinder 14 to the left of piston 12. The pressure fluid arrives from the brake pipe connection 29 via passage 27 and choke 28, so latch piston 24 will first be lifted.

In "Intermediate" position lobe 9 depresses the tappet 7 and latch nose 23 is in groove 22. This position is reached by admitting pressure fluid via passage 31 to the right side of piston 19 which is arrested by stop ring 16 with the parts positioned as stated.

In "Load" position lobe 9 depresses the tappet 6 and latch nose 23 is in groove 25. This position is reached when pressure fluid is admitted to passages 31 and 32. This has the effect of moving piston 13 to the left the length of cylinder 15.

As will later appear more clearly passages 31 and 32 are each fed from passage 27 through a choke 33, passage 43 and the weighing cylinder 34. Hence latch nose 23 is retracted before the shift to either "Intermediate" or "Load" position commences.

A vertical cylinder 34 is mounted on the spring-supported truck bolster (not shown) and contains a piston 35 whose rod 36 can collide at its upper end with a lug 37 on the truck frame 38 unless the piston is in its lowermost position. The upper end of the cylinder is vented to atmosphere at 39 and there are two side-ports with which the connections 31 and 32 respectively communicate. On an empty car the piston 35 cannot rise high enough to expose either port, but at half load it can rise far enough to expose the port leading to passage 31 and on a loaded car it can go further and also expose the port leading to passage 32.

Recourse is had to the familiar expedient of activating the piston 35 in about the first 50 p. s. i. of a system charge starting with a vented brake pipe, and then causing the piston to lower fully, and remain lowered until brake pipe pressure is once more reduced substantially to atmospheric pressure.

This cycle is controlled by the cut-off valve which is identified by the numeral 41 applied to its housing (see Fig. 2). This housing is continuously connected with the brake pipe by connection 29 and the valve controls communication between 29 and passage 27 which in turn is connected through choke 33 and passage 43 with the cylinder 34 at a point below piston 35. The cut-off valve proper is a poppet valve 44 which closes against its seat 45 in the direction of flow from 29 to passage 27. The valve 44 is biased in a closing direction by a light spring 46. Enclosed in the valve 44 is a cylinder in which a piston 47 (smaller in diameter than the seated area of the valve 44) may reciprocate. Piston 47 is exposed to the pressures above and below valve 44, and is connected to a stem 48 which carries a collar or secondary flange 49 fixed to it.

A diaphragm 51 is clamped at its periphery between parts of the housing 41 and is subject to pressure in passage 27 acting upward upon it. The upper face of diaphragm 51 is exposed to atmospheric pressure. At its center diaphragm 51 carries hub 52 biased downward (i. e. in the direction to open valve 44) by spring 53 which is stronger than spring 46. Stem 48 is slidable longitudinally through a guideway in hub 52 and is urged downward by a light spring 54 which reacts between a portion of hub 52 and an enlarged head carried by the upper end of stem 48. This affords a lost-motion connection between rod 48 and hub 52.

A tiltable spring-seated vent valve 55 has a stem 56 which projects into the path of flange 49. Tilting of the vent valve cocks it off of its seat and opens it, thus venting connection 27.

Assume the brake pipe has been vented and recharging starts. Brake pipe air will flow through 29, past valve 44 (which is then held open by spring 53) to passage 27. The chokes 28 and 33 assure that latch piston 24 is first forced back, then piston 12 is forced to the 32 is exposed the selector remains in "Empty" position. At this time or slightly later piston 25 will start to rise. The distance it can rise until arrested by stop 37 depends on the load on the car, and determines the position assumed by the selector valve. If neither passage 31 or 32 is exposed the selector remains in "Empty' position. If 31 only is exposed piston 19 moves the selector to "Intermediate" position. If 32 is also exposed piston 13 moves the selector all the way to "Load" position.

When passage 27 has been charged to about 50 p. s. i. diaphragm 51 will have lifted enough to allow valve 44 to close. This stops the pressure rise in passage 27 but brake pipe pressure continues to rise in 29. Soon valve 44 is firmly seated by pressure beneath it and piston 47 is subject to an increasing pressure differential, acting upward. Before charging is complete, piston 47 overpowers spring 54, flange 49 engages stem 56 and cocks valve 55 off its seat.

This vents connection 27, causing latch 23 to re-engage and seating valve 44 so firmly by pressure that it cannot again open until brake pipe pressure falls below about 5 p. s. i.

It will be observed that rod 48 has a lost-motion connection with hub 52 of diaphragm 51 and also a lost-motion connection with valve 44 produced by piston 47 which has a limited range of motion in its cylinder. It is probably unnecessary to point out that the lower side of piston 47 is exposed to brake pipe pressure at all times by a port drilled through the cylinder cap. The upper side of piston 47 is exposed to pressure above valve 44 acting through the clearance around stem 48 and clearly shown in Fig. 2.

Timing is controlled by the relative strengths of the springs 46, 53 and 54 and their coordination with the areas of valve 44 and piston 47 which are subject to pressure differentials when valve 44 is closed. Such timing can be made quite precise and Fig. 2 indicates proportions which have proved satisfactory with conventional brake pipe pressures used in freight service.

Obviously proportions can be varied and structural details can be modified, so the embodiment chosen for disclosure purposes, and described in detail, is exemplary and not limiting.

I claim:

1. A cut-off valve mechanism, comprising in combination, a housing having a brake pipe connection, a motor connection and a valve seat through which flow from the brake pipe connection to the motor connection occurs; a poppet valve arranged to close in the direction of such flow, against said seat; a movable abutment subject in a valve-closing direction to pressure in the motor connection; a rod having lost motion connections with said abutment and with said valve; two springs, a dominant spring biasing said abutment in a valve-opening direction and a weaker spring biasing said valve in a closing direction; a third spring weakly biasing said lost motion rod connection relatively to said abutment in the valve-opening direction; means affording an expansible chamber motor whose relatively movable components are interposed in the lost motion connection between the rod and said poppet valve; means, effective when said valve is closed to subject said expansible chamber motor to the pressure differentials between the brake pipe and motor connections; and a valve, biased to close, controlling a vent from the motor connection, and arranged to be opened by said expansible chamber motor when brake pipe pressure predominates sufficiently to overpower said third spring.

2. The combination defined in claim 1 in which the expansible chamber motor comprises a cylinder housed in the poppet valve and a piston fixed to the rod.

3. A cut-off valve mechanism, comprising in combination, a housing having a brake pipe connection, a motor connection and a valve seat through which flow from the brake pipe connection to the motor connection occurs; a poppet valve arranged to close in the direction of such flow, against said seat; a movable abutment subject in a valve closing direction to pressure in the motor connection; a rod having lost motion connections with said abutment and with said valve; two springs, a dominant spring biasing said abutment in a valve-opening direction and a weaker spring biasing said valve in a closing direction; a third spring weakly biasing said lost motion rod connection relatively to said abutment in the valve-opening direction; means affording an expansible chamber motor whose relatively movable components are interposed in the lost motion connection between the rod and said poppet valve, whereby the motor, when energized, moves the rod; means effective when said valve is closed to subject said expansible chamber motor to the pressure differentials between the brake pipe and motor connections; a lug on said rod; a valve having an actuator in the path of said lug, said valve controlling a vent from said motor connection; and yielding means serving to close said vent valve except when its actuator is displaced by said lug.

4. The combination defined in claim 3 in which said lug is in the form of a collar on the rod, and the vent-controlling valve is a poppet valve having a tail which extends transversely into the path of the collar and serves as said actuator.

References Cited in the file of this patent

UNITED STATES PATENTS

| | | |
|---|---|---|
| 2,517,885 | Klein | Aug. 8, 1950 |
| 2,690,932 | Thomas | Oct. 5, 1954 |